Aug. 9, 1932.     L. F. SAVAGE     1,871,281
STEREOSCOPIC PHOTOGRAPHY
Filed July 11, 1927     3 Sheets-Sheet 3
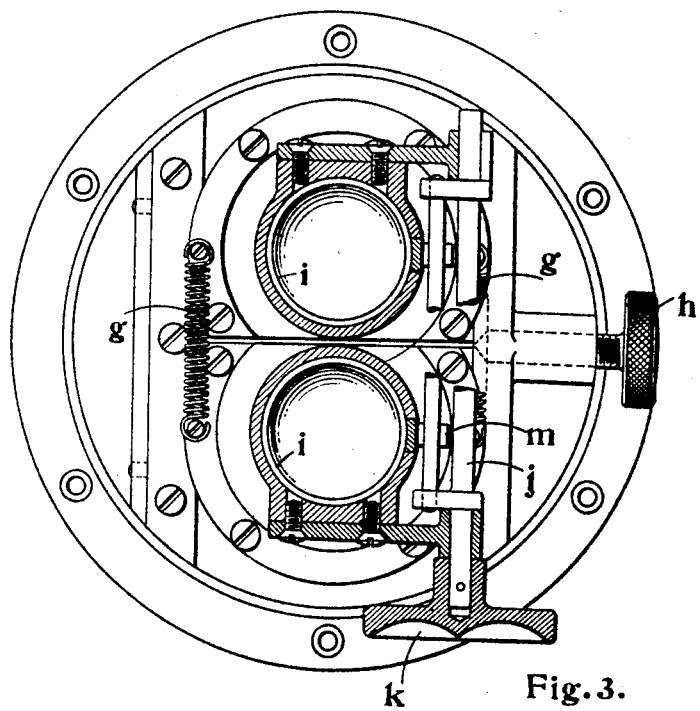
Fig. 3.
Fig. 4.
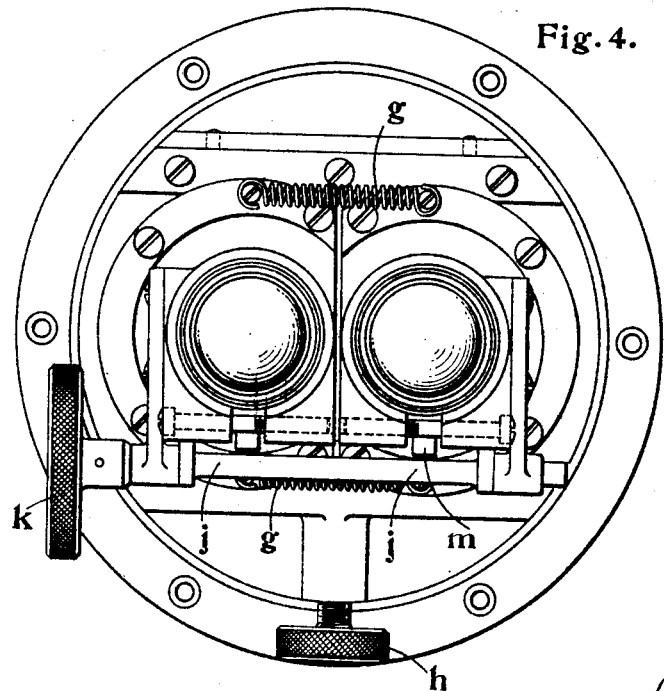
Inventor
L. F. Savage:
by
W. E. Evans
Attorney.

Patented Aug. 9, 1932

1,871,281

UNITED STATES PATENT OFFICE

LAWRENCE FRANCIS SAVAGE, OF LONDON, ENGLAND

STEREOSCOPIC PHOTOGRAPHY

Application filed July 11, 1927, Serial No. 204,928, and in Great Britain July 26, 1926.

This inventon relates to stereoscopic photography and stereoscopic cinematography.

According to the invention stereoscopically related images or more than one image are photographed upon the same plate or film in the use of two or more separated objective lenses, having equal focal length, adapted to produce at their focal planes corresponding aerial images of the respective views, without the use of screens, obturators or the like. In the focal planes of the objective lenses, intermediate lenses are mounted respectively in alignment, while at a determined position beyond the lenses last referred to lenses corresponding to the objective lenses are provided in alignment, and are adapted to re-photograph the aerial images produced by the objective lenses in the intermediate lenses and to project them with substantially parallel rays of light through a single superimposing lens suitably disposed for the purpose, whereby the respective images may be superposed upon a plate or film. For this purpose the respective objective lenses when two are employed, are mounted so that their distance apart may be adjusted to superimpose the respective images and the objective lenses are also capable of longitudinal adjustment.

The invention comprises an optical system adapted for photography or cinematography in which preferably two objective lenses are adapted to produce aerial images and are mounted so that the distance between their axes may be capable of adjustment and in which other lenses are provided for re-photographing the aerial images, and another lens is provided for superimposing the images produced, without the necessity of any mechanical means being employed for dissolving the respective images one into the other.

The invention comprises the features of method and construction hereinafter described.

It is of importance that the lenses be set with accuracy and precision, and that their respective positions be maintained. It is thus of practical advantage that the construction of the parts be such that the respective lenses and their mountings be held or secured in their set positions, but means are provided for adjustment of the distance apart of the objective lenses, and their positions with relation to the interposed or intermediate lenses; and similar means provided for the adjustment of position of the other lenses used.

It will be understood that when the picture to be photographed is brought into focus two images are projected by the re-photographing lenses and that the objective lenses are adjusted laterally whereby the respective images are superimposed so that a single stereoscopic picture is produced comparable with the picture obtained in viewing stereoscopically related pictures in a stereoscope.

The construction hereinbefore specifically described of an optical system suitable for taking stereoscopic photographs is illustrated in the drawings in which:

Figures 3 and 4 are end views, Figure 3 partly in section, corresponding respectively to Figures 1 and 2 and showing the manner of mounting the objective lenses.

In the accompanying drawings $a$ are the respective objective lenses, $b$ the respective intermediate lenses, $c$ the respective re-photographing lenses, and $d$ the superimposing lens; while $e$, $f$ and $e'$, $f'$ are the respective parts of the tubular fittings, each part $e$, $f$ or $e'$, $f'$ carrying one of the objective lenses $a$, one of the intermediate lenses $b$, and one of the re-photographing lenses $c$, and the respective parts are mounted with a clearance for example 8 millimeters or more between to permit of the necessary lateral movement of the objective lenses to superimpose the images on the lens $d$. For this purpose the respective parts $e$, $f$ and $e'$, $f'$ are mounted to slide in guides at the front of the casing $n$, and are maintained pressed inwards by means of two helical springs $g$, and they are separated with precision to the extent required by such means as an adjusting screw threaded pin $h$ provided with a milled head, whereby the two parts $e$, $f$ and $e'$, $f'$ of the connected tubular fittings may be adjusted to slide transversely inwards or outwards for the superimposition of the images.

Figure 1:
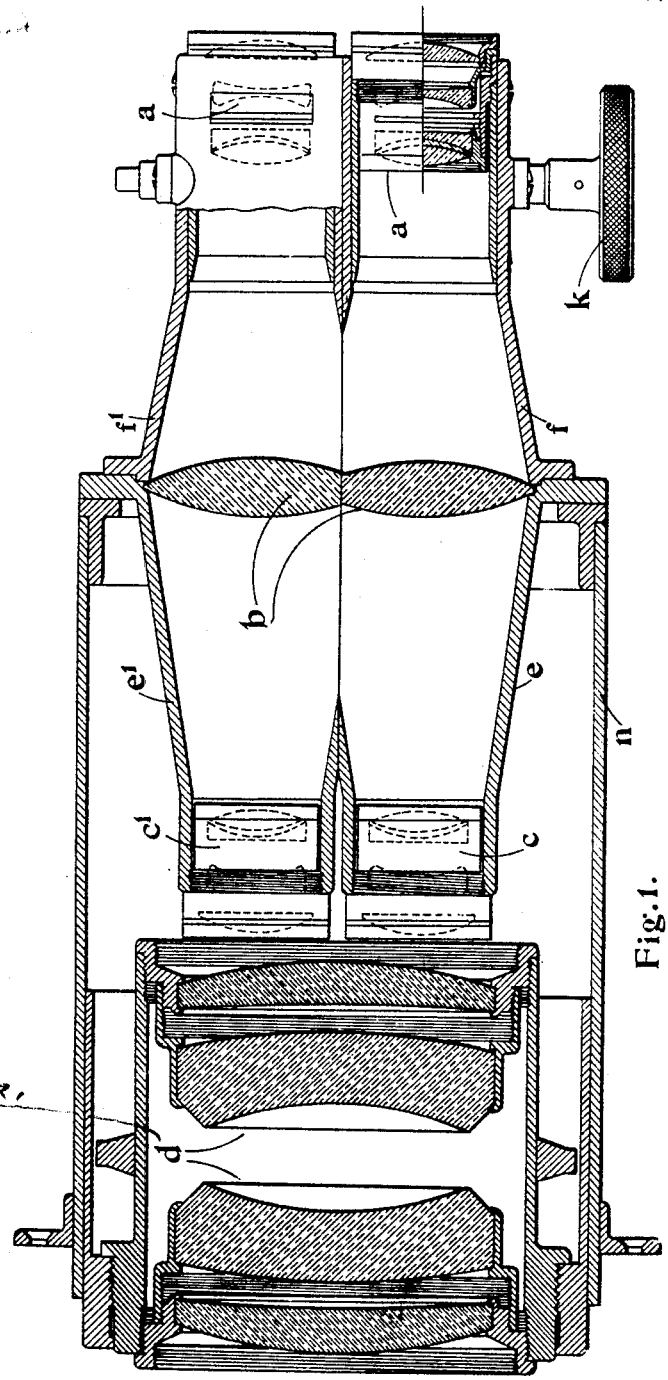
Figure 1 is a longitudinal sectional plan of the lens system for a camera as hereinbefore specifically described.
Figure 2:
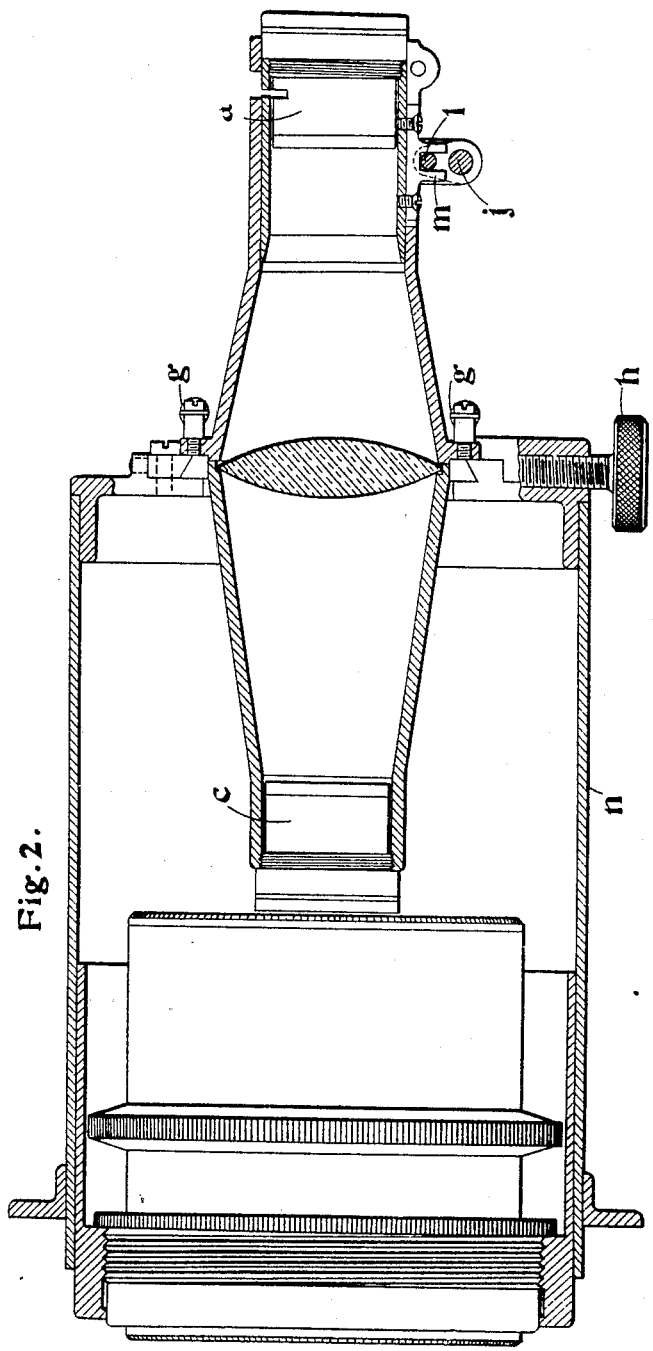
Figure 2 is a corresponding longitudinal sectional elevation.

The tubular mounts $i$ within which the respective objective lenses $a$ are carried are adapted to be moved axially within the ends $f$, $f'$ of the connected fittings by suitable means such as illustrated more particularly in Figures 2, 3 and 4, and comprising a spindle $j$ adapted to be partially rotated by means of a milled nut $k$ whereby movement may be imparted to the rod $l$ which engages in slots provided in downwardly extending lugs $m$ carried beneath the respective mounts $i$, and extending through longitudinal slots in the respective ends $f$, $f'$ of the connected tubular fittings.

It will be understood that the construction illustrated in the drawings is merely exemplary.

It will be understood that such a lens system as hereinbefore described may be used with mechanical means for dissolving the separated view point images one into the other comprising, for example, a dissolving disc made of a translucent medium which will not cause distortion of the respective images and which may be disposed in front of one or more of the objective lenses. It will, however, be understood that while mechanical means such as dissolving discs are not essential they may be used, and that such a lens system as hereinbefore described may be used for the production of separate photographs as well as a cinematographic series of photographs.

I claim:

1. A lens system comprising in combination a set of separated objective lenses of equal focal length, a set of intermediate lenses in alignment with the said set of objective lenses and disposed in the focal planes thereof, said intermediate lenses being adapted for the reception of aerial images produced at the respective focal planes of the said objective lenses, a set of rephotographing lenses in alignment with the said intermediate lenses and at a determined distance therefrom, a superimposing lens disposed adjacent to the said set of rephotographing lenses, and means for adjusting the distance apart of the axes of the objective lenses, intermediate lenses and rephotographing lenses without effecting an axial movement of the said lenses substantially as hereinbefore described.

2. A lens system comprising in combination a set of separated objective lenses of equal focal length, a set of intermediate lenses in alignment with the said set of objective lenses and disposed in the focal planes thereof, said intermediate lenses being adapted for the reception of aerial images produced at the respective focal planes of the said objective lenses, a set of rephotographing lenses in alignment with the said intermediate lenses and at a determined distance therefrom, and means for the longitudinal adjustment of the said objective lenses, independently of the intermediate and rephotographing lenses, while maintaining the distance apart of the axes of the said lenses and a superimposing lens disposed adjacent to the said set of rephotographing lenses, substantially as hereinbefore described.

3. A lens system comprising in combination a set of separated objective lenses of equal focal length, a set of intermediate lenses in alignment with the said set of objective lenses and disposed in the focal planes thereof, said intermediate lenses being adapted for the reception of aerial images produced at the respective focal planes of the said objective lenses, a set of rephotographing lenses in alignment with the said intermediate lenses and at a determined distance therefrom, the said objective, intermediate and rephotographing lenses being set in tubular fittings in alignment, means for adjusting the distance apart of the axes of the said fittings, means for adjusting the objective lenses longitudinally in the said fittings; and a superimposing lens disposed adjacent to the said set of rephotographing lenses, the said superimposing lens being mounted in the rear of a casing at the front of which the tubular fittings referred to are mounted, substantially as hereinbefore described.

LAWRENCE FRANCIS SAVAGE.